(12) United States Patent
Liu et al.

(10) Patent No.: US 7,756,673 B2
(45) Date of Patent: *Jul. 13, 2010

(54) MEASURING DEVICE FOR MEASURING ASPECTS OF OBJECTS

(75) Inventors: Qing Liu, Shenzhen (CN); Jun-Qi Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 220 days.

This patent is subject to a terminal disclaimer.

(21) Appl. No.: 11/966,964

(22) Filed: Dec. 28, 2007

(65) Prior Publication Data
US 2009/0037141 A1    Feb. 5, 2009

(30) Foreign Application Priority Data
Aug. 3, 2007    (CN) .................... 2007 1 0201272

(51) Int. Cl.
*G01B 3/22* (2006.01)

(52) U.S. Cl. ...................................... 702/167

(58) Field of Classification Search ................. 702/167, 702/168, 170; 33/551, 552, 553, 554
See application file for complete search history.

(56) References Cited

U.S. PATENT DOCUMENTS

2005/0039342 A1*    2/2005    Kirstine ................ 33/552

\* cited by examiner

*Primary Examiner*—Drew A Dunn
*Assistant Examiner*—Stephen J Cherry
(74) *Attorney, Agent, or Firm*—Frank R. Niranjan (57) ABSTRACT

An exemplary measuring device (100) for measuring aspects of objects includes a first contour measuring probe (10), a second contour measuring probe (20) and a processor (30). The first contour measuring probe (10) has a first tip extension (16) and a first displacement sensor (19). The first tip extension (16) is slidable in a first direction. The first displacement sensor (19) is used to sense a displacement of the first tip extension (16). The second contour measuring probe (20) has a second tip extension (26) and a second displacement sensor. The second tip extension (26) is slidable in the first direction. The second displacement sensor is used to sense a displacement of the second tip extension (26). The processor (30) is electrically connected to the first displacement sensor (19) and the second displacement sensor respectively.

12 Claims, 10 Drawing Sheets

MEASURING DEVICE FOR MEASURING ASPECTS OF OBJECTS

CROSS-REFERENCE TO RELATED APPLICATIONS

This application is related to nine co-pending U.S. patent applications, which are: U.S. Pat. No. 7,398,603, filed on Dec. 15, 2006, and entitled "DISTANCE MEASURING PROBE WITH AIR DISCHARGE SYSTEM", U.S. Pat. No. 7,490,413, filed on Aug. 23, 2007, and entitled "CONTOUR MEASURING DEVICE WITH ERROR CORRECTING UNIT", application Ser. Nos. 11/966,951 and 11/966,952, filed on Dec. 28, 2007, and both entitled "CONTOUR MEASURING PROBE", application Ser. Nos. 11/966,957 and 11/966,956, filed on Dec. 28, and both entitled "CONTOUR MEASURING METHOD FOR MEASURING ASPECTS OF OBJECTS", application Ser. No. 11/966,961, filed on Dec. 28, 2007, and entitled "MEASURING DEVICE AND METHOD FOR USING THE SAME", application Ser. No. 11/966,959, filed on Dec. 28, 2007, and entitled "BASE AND CONTOUR MEASURING SYSTEM USING THE SAME", and U.S. Pat. No. 7,594,338, filed on Dec. 28, 2007, and entitled "CONTOUR MEASURING PROBE FOR MEASURING ASPECTS OF OBJECTS". In U.S. Pat. Nos. 7,398,603, 7,490,413, and application Ser. No. 11/966,951, 11/966,957, and 11/966,956, the inventors are Qing Liu, Jun-Qi Li, and Takeo Nakagawa. In applications Ser. Nos. 11/966,961 11/966,959 and 11/966,951, the inventors are Qing Liu and Jun-Qi Li. In U.S. Pat. No. 7,594,338, the inventors are Jianbin Kong and Qing Liu. In U.S. Pat. Nos. 7,398,603 and 7,490,413, the assignee is Hon HAI PRECISION INDUSTRY CO. LTD and FINE TECH Corporation, and the assignee of other applications is HONG FU JIN PRECISION INDUSTRY (ShenZhen) CO., LTD and Hon HAI PRECISION INDUSTRY CO. LTD.

BACKGROUND OF THE INVENTION

1. Field of the Invention

The present invention relates generally to measuring devices for measuring aspects of objects, and more particularly to a measuring device for ultra-precise measuring aspects of objects.

2. Discussion of the Related Art

Figure 10:
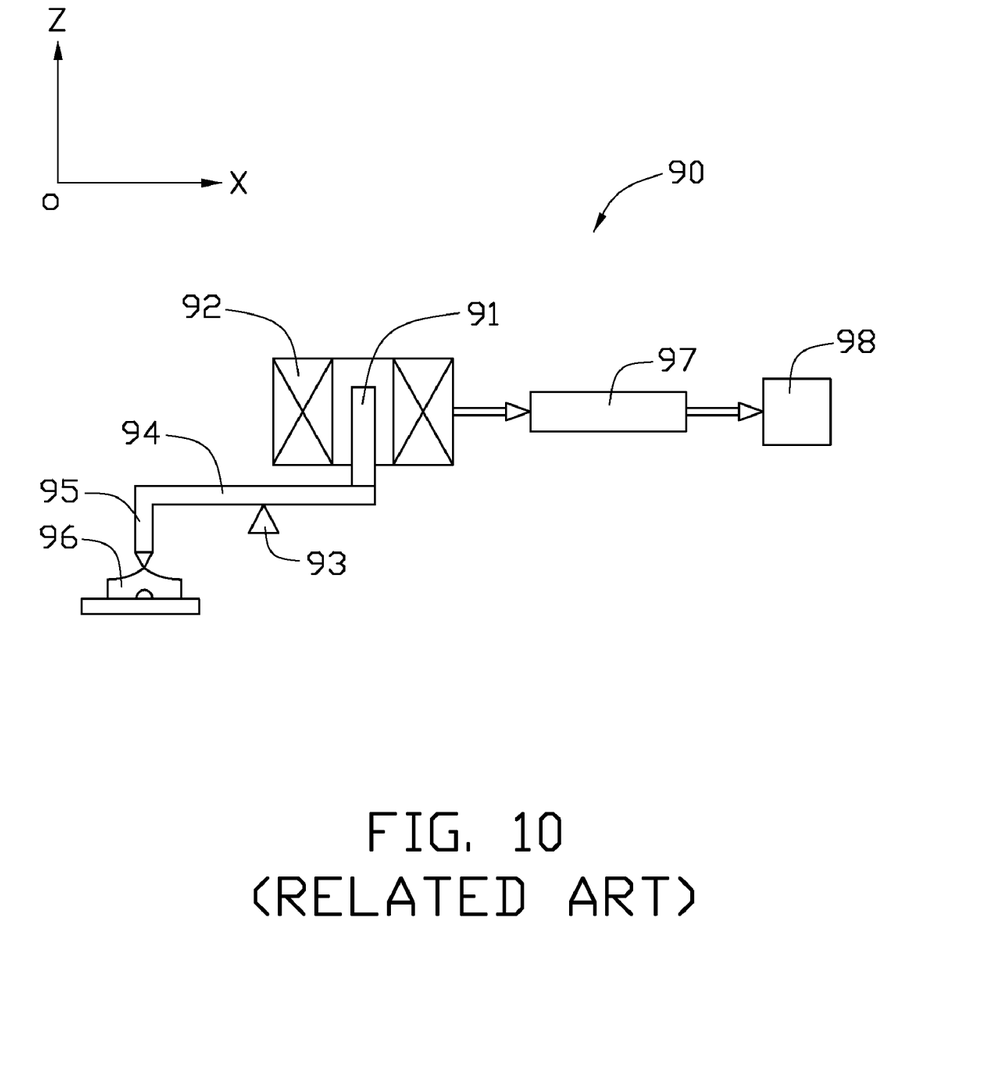
FIG. 10 is a schematic view of a conventional measuring device.

Referring to FIG. 10, a typical measuring device 90 includes a magnetic core 91, a coil 92, a fulcrum 93, a level 94, and a measuring tip 95. A distal end of the measuring tip 95 always contacts with a surface of a workpiece 96. A typical contour measuring method using the measuring device 90 includes the following steps: (1) driving the workpiece 96 to move along an X-axis; (2) the measuring tip 95 moves along a Z-axis because the workpiece 96 has a curved surface, thus the level 94 rotates about the fulcrum 93; (3) the magnetic core 91 moves in the coil 92, this movement of the magnetic core 91 induces a current in the coil 92; (4) The current flows into the managing circuit 97 and the managing circuit 97 amplifies and transforms the current into a digital value that is used as a signal to the computer 98; (5) the computer 98 calculates a displacement of the magnetic core 91 according to the digital signal, thus indirectly determining a displacement of the measuring tip 95.

However, the above-described measuring device has the following disadvantages. Firstly, cumulative errors may generate and propagate from the coil 92, and in each of the conversions, to the computer calculation of the displacement of the core 91. Thus, a cumulative error is very large in the contour measuring method. Secondly, a non-linear error is generated when the coil 92 works in a non-linear region of the coil 92. Thirdly, the measuring range is very small because of the non-linear region of the coil 92. Finally, in order to measure the lower surface of the workpiece 96, the workpiece 96 should be turned over. This turning over and repositioning of the workpiece 96 may result in the workpiece 96 being repositioned outside of the original position, thus the measuring precision further decreases.

Therefore, a measuring device for measuring aspects of objects which have high precision are desired.

SUMMARY

An exemplary measuring device for measuring aspects of objects includes a first contour measuring probe, a second contour measuring probe and a processor. The first contour measuring probe has a first tip extension and a first displacement sensor. The first tip extension is slidable in a first direction. The first displacement sensor is used to sense a displacement of the first tip extension. The second contour measuring probe has a second tip extension and a second displacement sensor. The second tip extension is slidable in the first direction. The first displacement sensor is used to sense a displacement of the second tip extension. The processor is electrically connected to the first displacement sensor and the second displacement sensor respectively.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present measuring device for measuring aspects of objects. Moreover, in the drawings, like reference numerals designate corresponding parts throughout the several views, and all the views are schematic.

DETAILED DESCRIPTION OF THE EMBODIMENTS

Reference will now be made to the drawings to describe preferred embodiments of the present measuring device, in detail.

Figure 1:
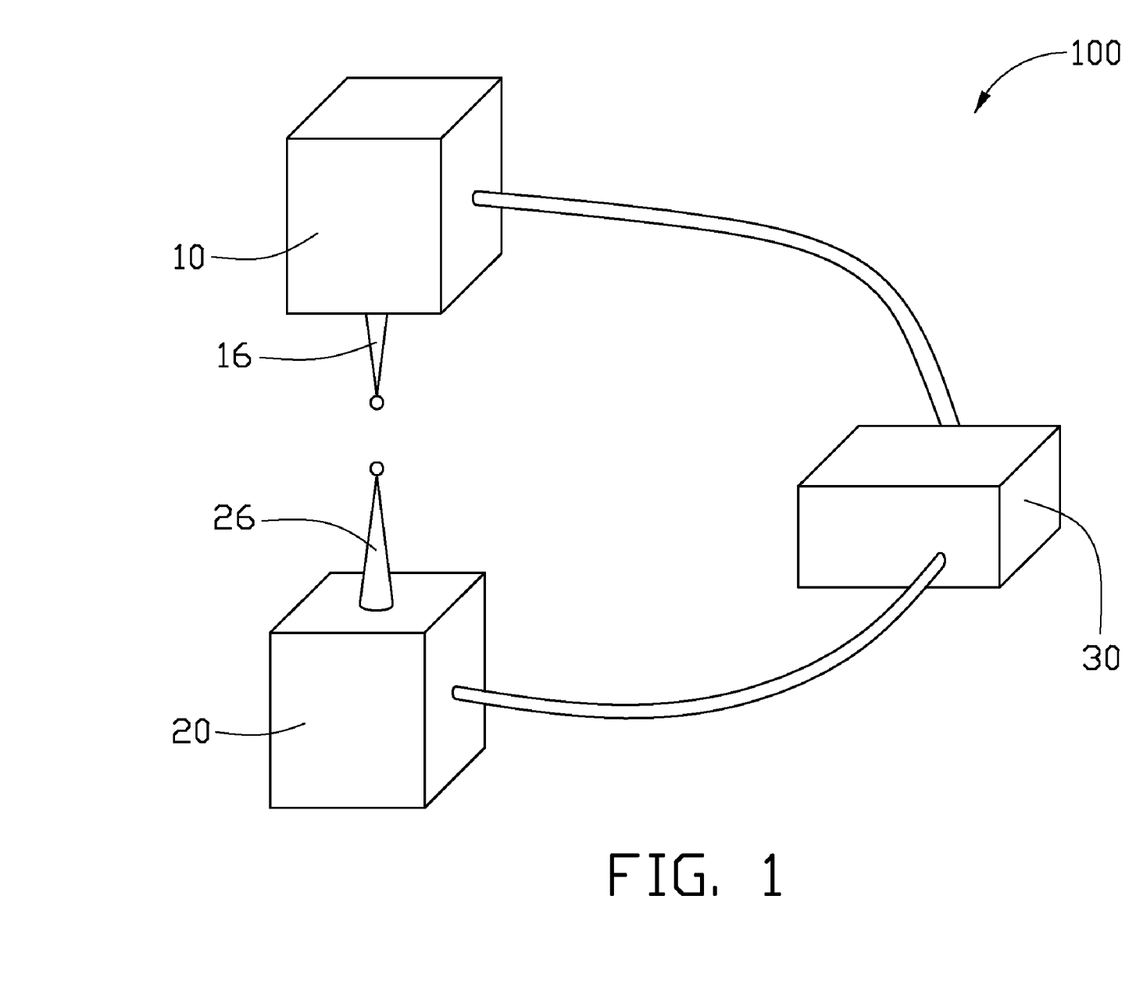
FIG. 1 is a schematic, isometric view of a measuring device for measuring aspects of objects according to a first preferred embodiment of the present invention.

Referring to FIG. 1, a measuring device 100 in accordance with a first embodiment is shown. The measuring device 100 includes a first contour measuring probe 10, a second contour measuring probe 20, and a processor 30. The first and second contour measuring probes 10, 20 are electrically connected to the processor 30.

Figure 2:
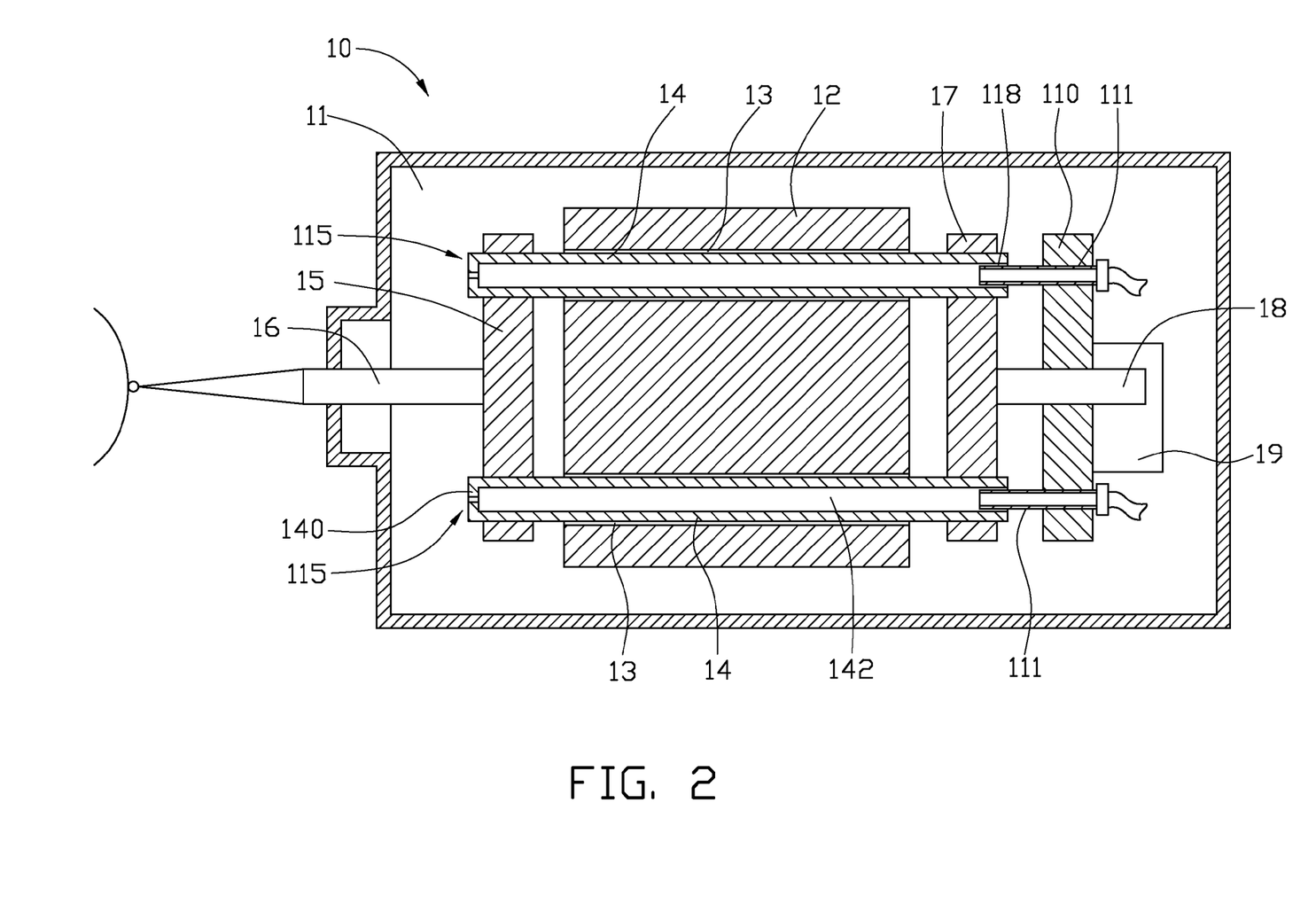
FIG. 2 is a top plan, cross-sectional view of a first contour measuring probe of the measuring device of FIG. 1.
Figure 3:
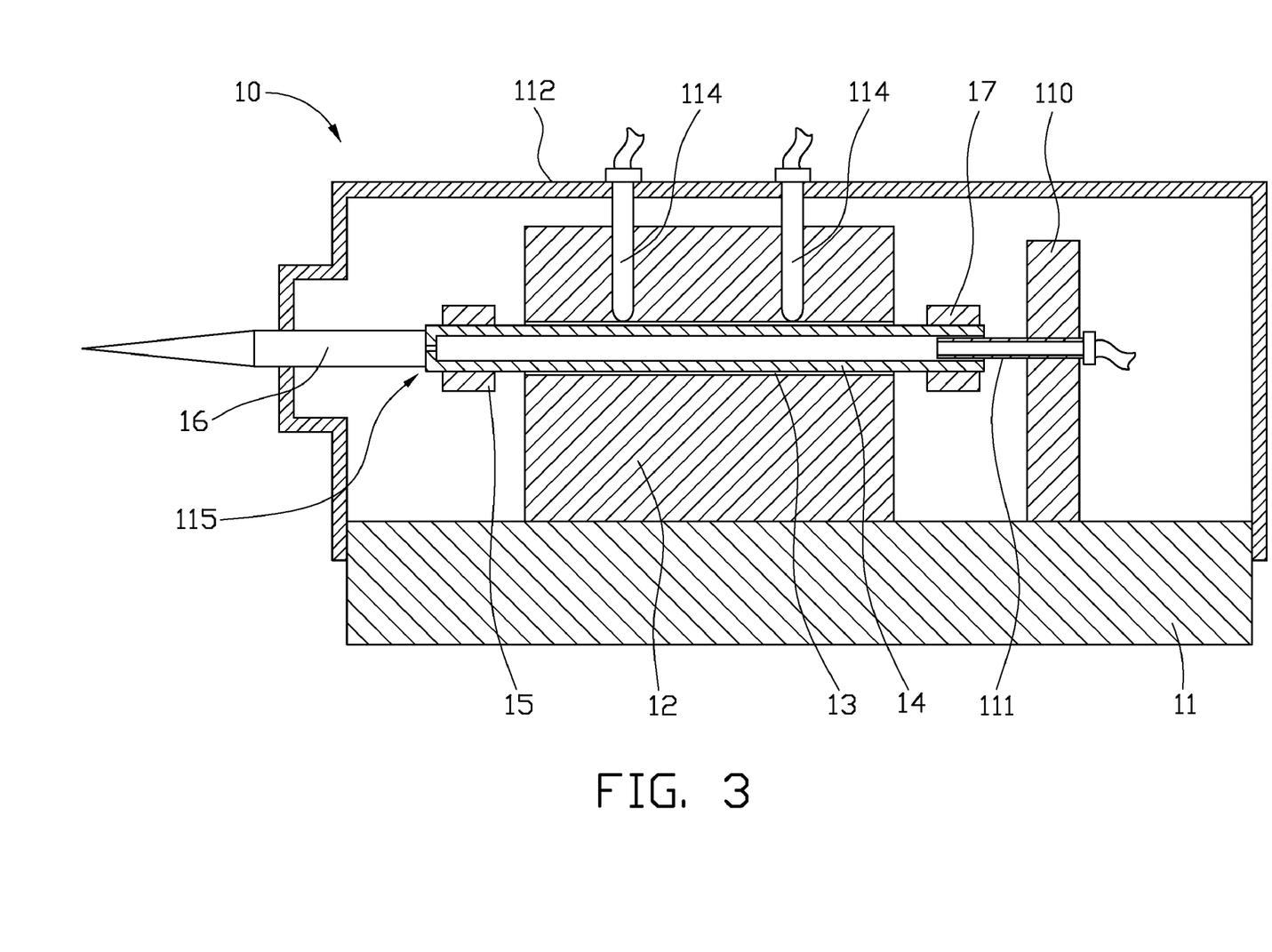
FIG. 3 is a side, cross-sectional view of the first contour measuring probe of FIG. 2.

Referring to FIG. 2 and FIG. 3, the first contour measuring probe 10 includes a base 11, a tube guide 12, two hollow tubes 14, a first tube frame 15, the first tip extension 16, a second tube frame 17, a linear measuring scale 18, a displacement sensor 19, a pipe holder 110, and two pipes 111. The hollow tubes 14 and the first and second tube frames 15, 17 cooperatively form a movable rack (not labeled).

The base 11 is substantially a flat rectangular sheet. It should be understood that the base 11 may alternatively be any other suitable shapes. The tube guide 12 is securely mounted onto the base 11. The tube guide 12 has a front end and a rear end. The tube guide 12 defines two tube chutes 13 each extending from the front end to the rear end. The tube chutes 13 are spaced apart from, and aligned parallel to each other.

Each of the hollow tubes 14 is a cylinder defining a cavity 142 that extends through the hollow tube 14 from a open rear end of the hollow tube 14 to a front cylinder base 140 of the hollow tube 14. Each hollow tube 14 is received through a corresponding tube chute 13 of the tube guide 12. The open rear ends of the hollow tubes 14 protrude out from the rear end of the tube guide 12 and are fixed onto the second tube frame 17. The cylinder bases 140 of the hollow tubes 14 protrude out from the front end and are fixed onto the first tube frame 15. An outer diameter of the hollow tubes 14 is configured to be smaller than a diameter of the tube chutes 13, so that a gap (not labeled) is defined between each hollow tube 14 and the tube guide 12. Air is continuously pumped into the gap between the hollow tubes 14 and the tube guide 12 at a predetermined rate. Thus, an air bearing (not labeled) is formed between each hollow tube 14 and the tube guide 12 when the gaps are filled with air. Therefore, frictional forces between the hollow tubes 14 and the tube guide 12 are minimal. As a result, the hollow tubes 14 are able to move smoothly in the tube chutes 13 correspondingly.

Each of the pipes 111 is partially inserted into the open end of a corresponding hollow tube 14. An outer diameter of the pipes 111 is smaller than an inner diameter of the cavities 142 of the hollow tubes 14, so that a gap 118 is defined between each pipe 11 and the corresponding hollow tube 14. An air bearing (not labeled) is formed between each pipe 111 and the corresponding hollow tube 14 when air is pumped into the cavities 142 of the hollow tubes 14 via the pipes 111. Therefore, friction between the pipes 111 and the hollow tubes 14 is significantly small correspondingly. It should be understood that the gaps 118 may be omitted, and as an alternative, a lubricant can be applied between the pipes 111 and the hollow tubes 14 to reduce friction.

The pipe holder 110 is fixed on the base 11. The pipe holder 110 is configured to hold the pipes 111 in position. When air is pumped into the cavities 142 of the hollow tubes 14, an air current inside the cavities 142 creates a pushing force that pushes the hollow tube 14 away from the pipes 111, thereby driving the first tip extension 16 away from the second tube frame 17. The air pumped into the cavities 142 of the hollow tubes 14 and the tube chutes 13 may also be any suitable kinds of gas such as oxygen, nitrogen, etc.

The first tip extension 16 is needle-shaped, and has a contact tip (not labeled) that touches a surface of an object when the first contour measuring probe 10 is used to measuring the object. The first tip extension 16 is fixed on the first tube frame 15 so that the first tip extension 16 is linearly movable together with the movable rack. The linear measuring scale 18 is fixed on the second tube frame 17 such that it moves (displaces) linearly when the movable rack moves. The displacement sensor 19 is mounted on the base 11 corresponding to the linear measuring scale 18. The displacement sensor 19 is used for reading displacement values of the linear measuring scale 18. Alternatively, the positions of the linear measuring scale 18 and the displacement sensor 19 may be exchanged.

Again referring to FIG. 3, the first contour measuring probe 10 further includes a cover 112 that engages with the base 11 and completely seals other various components of the first contour measuring probe 10 except the base 11 and a part of the first tip extension 16. The cover 112 defines an opening (not labeled) for allowing an end portion including the contact tip of the first tip extension 16 to extend out from the opening. The air is pumped into the gaps between the tube guide 12 and the hollow tubes 14 to form the air bearing via a plurality of tubes 114 mounted to the cover 112.

The first contour measuring probe 10 further includes an air discharge system 115. The air discharge system 115 is configured to eject air out of the cavity 142 of each hollow tube 14. The air discharge system 115 can be selected from one or more of a group of a first air eject hole (not shown) defined in a center of the cylinder base 140 of each hollow tube 14; a second air eject hole (not shown) defined in the cylinder base 140 of each hollow tube 14 and a plurality of peripheral air eject holes (not shown) defined in the cylinder base 140 and surrounding the second air eject hole; a plurality of third air eject holes (not shown) defined in the cylinder base 140 of each hollow tube 14; a plurality of cylindrical fourth air eject holes (not shown) defined in a sidewall of each hollow tube 14; and the gap 118 between each hollow tube 14 and the corresponding pipe 111. That is, the air discharge system 115 is a channel communicating an outer of the hollow tube 14 and the cavity 142 of the hollow tube 14.

In alternative embodiments, the first contour measuring probe 10 can include only one hollow tube 14 or more than two hollow tubes 14. In such embodiments, there can correspondingly be only one pipe 111 or more than two pipes 111. The tube guide 12 may define only one tube chute 13 or more than two tube chutes 13 corresponding to the number of the hollow tubes 14.

In use, the first contour measuring probe 10 is placed near the object. The pipes 111 and the tubes 114 communicate with an air chamber (not shown), and air is pumped into the cavities 142 of the hollow tubes 14 and the gaps between the tube guide 12 and the hollow tubes 14. When the contact tip of the first tip extension 16 touches the object, the movable rack together with the first tip extension 16 stops moving. When the first tip extension 16 and correspondingly the linear measuring scale 18 move from one position to another position, the displacement sensor 19 detects and reads a displacement of the linear measuring scale 18. That is, a displacement of the first tip extension 16 is measured. The displacement sensor 19 connected to the processor 30 sends the displacement of the first tip extension 16 to the processor 30.

When air is pumped into the cavities 142 of the hollow tubes 14, air pressure in the cavities 142 pushes air out of the hollow tubes 14 via the air discharge systems 115. That is, air is continuously pumped into the hollow tubes 14 via the pipes 111 and continuously ejected out of the hollow tubes 14 via the air discharge systems 115. The air pumped into the hollow tubes 14 creates an air current that pushes the hollow tubes 14 to move in a direction that the hollow tubes 14 move out of the tube guide 12. The air pressure pushing the hollow tubes 14 is relatively small and steady. That is, an overall measuring force that pushes the first tip extension 16 is relatively small and steady. As a result, the first tip extension 16 of the first contour measuring probe 10 is pushed so that the contact tip 162 gently touches the object. Thus, the contact tip of the first tip extension 16 and the object are not easily deformed or damaged, thereby improving a precision of measurement. In addition, a pressure inside the cover 112 is kept higher than that of the pressure of the environment outside the cover 112, because air ejecting out of the air bearings and the hollow tubes 14 fills the cover 112. Thus, dust and other particles are prevented from entering the cover 112 through any openings thereof.

The second contour measuring probe 20 has a same structure as the first contour measuring probe 10. The processor 30 is electrically connected to the linear measuring scale 18 of the first contour measuring probe 10 and a linear measuring scale of the second contour measuring probe 20.

Figure 4:
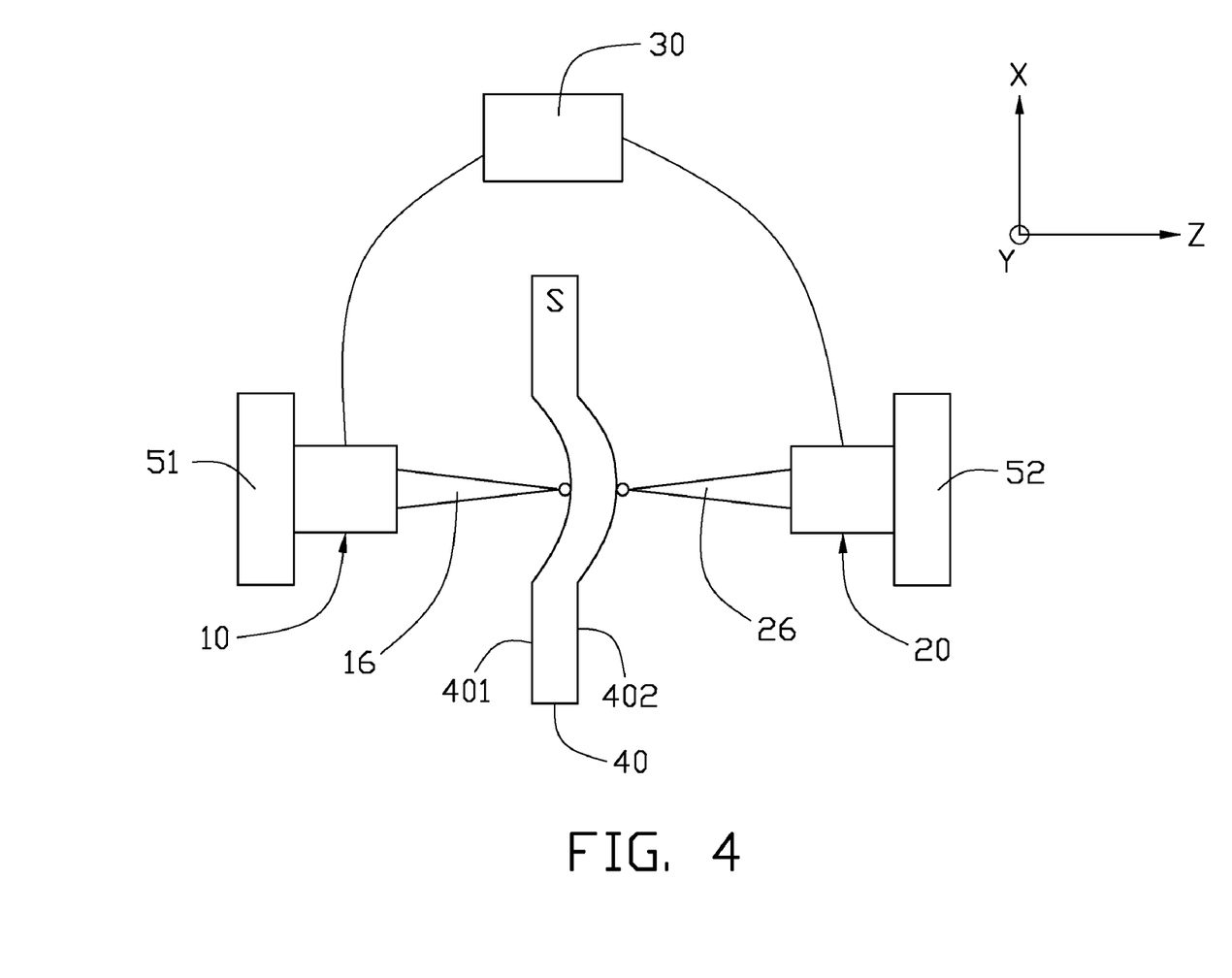
FIG. 4 is a schematic view of the measuring device of FIG. 1 measuring aspects of an object.
Figure 5:
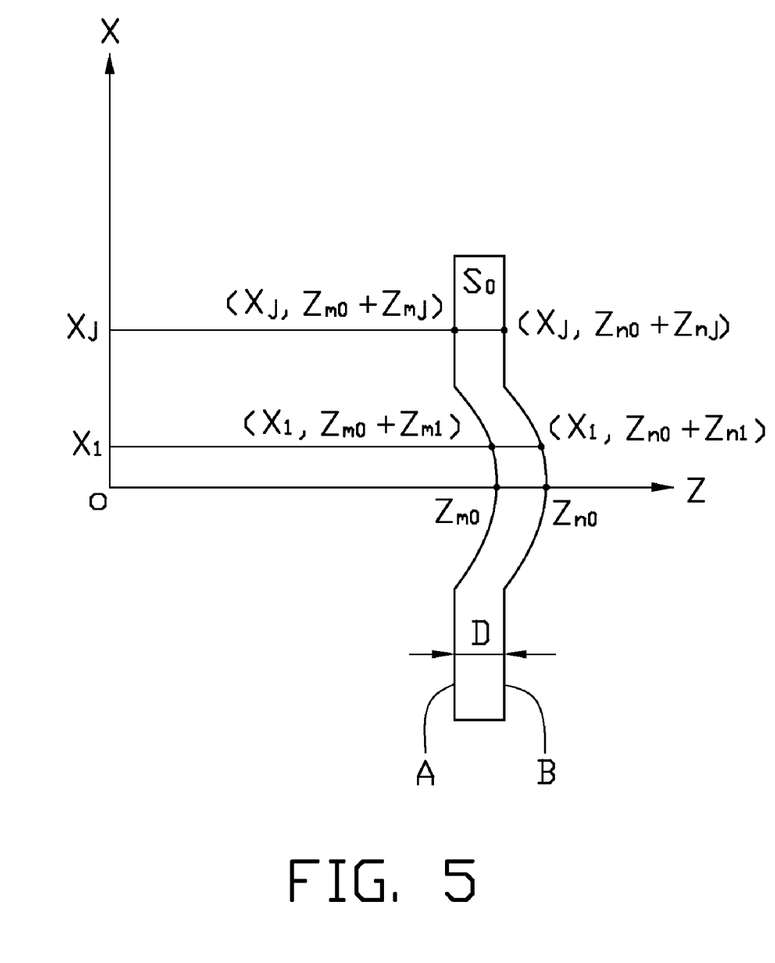
FIG. 5 is a chart showing a process that a processor calculates values of a cross-section $S_0$ of the object of FIG. 4.

Referring to FIG. 4 and FIG. 5, before measuring, the first contour measuring probe 10 is secured on a slidable platform 51 that is mounted on a machine (not shown) and slidable parallel to the XY-plane. The second contour measuring probe 20 is secured on a slidable platform 52 that is mounted on the machine and slidable parallel to the XY-plane. An object 40 has a first surface 401 and a second surface 402 opposite to the first surface 401. The first tip extension 16 of the first contour measuring probe 10 gently pushes against the first surface 401, and a second tip extension 26 of the second contour measuring probe 20 gently pushes against the second surface 402. The first contour measuring probe 10 and the second contour measuring probe 20 are positioned in a manner such that the first tip extension 16 and the second tip extension 26 are aligned pointing toward each other perpendicular a same point on the XY plane.

In a measuring process, the slidable platforms 51, 52 are moved in a same direction and drives the first tip extension 16 and the second tip extension 26 to move along a same linear axis. When the first and second tip extensions 16, 26 move along the X-axis, the first tip extension 16 remains gently pushing against the first surface 401 of the object 40 and the second tip extension 26 remains gently pushing against the second surface 402 of the object 40. After the first and second tip extensions 16, 26 linearly move across the object 40 once, the processor 30 can compute (map) a cross-section S of the object 40 according to the displacement information provided by the first contour measuring probe 10 and the second contour measuring probe 20.

A method for computing the cross-section S is detailed described as follows.

(1) The first contour measuring probe 10 is moved to a first predetermined position such that the first tip extension 16 is dragged along and gently pushes against the first surface 401 of the object 40 at a first predetermined point. Then, the processor 30 records a coordinate of the first predetermined point such as $(0, Y_0, Z_{m0})$. The second contour measuring probe 20 is moved to a second predetermined position such that the second tip extension 26 is dragged along and gently pushes against the second surface 402 of the object 40 at a second predetermined point. At the same time, the processor 30 records the coordinate of the second predetermined point such as $(0, Y_0, Z_{n0})$. The first predetermined point and the second predetermined point lies on a straight line parallel to the Z-axis.

(2) The slidable platforms 51, 52 move parallel to the X-axis of a distance $X_1$ at a same speed, thus the first contour measuring probe 10 is driven to move parallel to the X-axis with the first tip extension 16 pushing against the first surface 401 to the third predetermined point, and the second contour measuring probe 20 is driven to move parallel to the X-axis with the first tip extension 26 pushing against the second surface 402 to the third predetermined point. The third predetermined point and the fourth predetermined point are lies on a straight line parallel to the Z-axis. The linear measuring scale 18 of the first contour measuring probe 10 measures the displacement $Z_{m1}$ along the Z-axis of the first tip extension 16, and sends the information to the processor 30. The processor 30 records a coordinate of the third predetermined point as $(X_1, Y_0, Z_{m0}+Z_{m1})$. The linear measuring scale of the second contour measuring probe 20 measures the displacement $Z_{n1}$ along the Z-axis of the second tip extension 26, and sends the information to the processor 30. The processor 30 records a coordinate of the fourth predetermined point as $(X_1, Y_0, Z_{n0}+Z_{n1})$.

(3) The first tip extension 16 of the first contour measuring probe 10 is sequentially moved to a series of predetermined point, thus the processor 30 will obtain a series of point coordinates of $(X_2, Y_0, Z_{m0}+Z_{m2})$, $(X_3, Y_0, Z_{m0}+Z_{m3})$ ... $(X_j, Y_0, Z_{m0}+Z_{mj})$. The second tip extension 26 of the second contour measuring probe 20 is moved to a series of predetermined point on a straight line across the object, thus the processor 30 will obtain a series of point coordinates of $(X_2, Y_0, Z_{n0}+Z_{n2})$, $(X_3, Y_0, Z_{m0}+Z_{m3})$ ... $(X_j, Y_0, Z_{m0}+Z_{mj})$.

(4) The processor 30 computes curvatures of a curve A of the object 40 in a plane of $Y=Y_0$, according to the series of point coordinates of $(0, Y_0, Z_{m0})$, $(X_1, Y_0, Z_{m0}+Z_{m1})$, $(X_2, Y_0, Z_{m0}+Z_{m2})$ ... $(X_j, Y_0, Z_{m0}+Z_{mj})$. The processor 30 computes curvatures of a curve B of the object 40 in the plane of $Y=Y_0$, according to the series of point coordinates of $(0, Y_0, Z_{n0})$, $(X_1, Y_0, Z_{n0}+Z_{n1})$, $(X_2, Y_0, Z_{n0}+Z_{n2})$ ... $(X_j, Y_0, Z_{n0}+Z_{nj})$. Then, the processor 30 computes a distance D between the curve A and the curve B according to the formula of $D_j=|(Z_{m0}+Z_{mj})-(Z_{n0}+Z_{nj})|$. Therefore, the cross-section $S_0$ of the object 40 including the curves can be derived by the processor 30 via the curve A, the curve B and the distance D between the curve A and the curve B.

After computing the cross-section $S_0$ in the plane of $Y=Y_0$, the first contour measuring probe 10 and the second contour measuring probe 20 can move into planes of $Y=Y_1$, $Y=Y_2$ ... $Y=Y_j$ carried by the slidable platforms 51, 52 respectively. Afterwards, the measuring device 100 repeats the above described four steps (1), (2), (3), (4) in each plane to get a plurality of cross-sections $S_1, S_2 ... S_j$ of the object 40. Then, the plurality of cross-sections $S_0, S_1, S_2 ... S_j$ is piled by the processor 30 to obtain an aspect of the object 40.

Because the first and second contour measuring probes 10, 20 of the measuring device 100 can measure the displacements of the first and second tip extensions 16, 26 by the displacement sensors, and the displacement sensors send the displacement information on the first and second tip extensions 16, 26 to the processor 30 immediately, the measuring device 100 have a high measuring precision. Furthermore, the object 40 does not need to be rotated during the measuring process, thus the measuring precision of the measuring device 100 further increases.

It should be understood that the slidable platforms 51, 52 can also carry the contour measuring probes 10, 20 to move along the Y-axis, in order to get a plurality of cross-sections of the object 40 parallel to the YZ plane. The plurality of cross-sections also can be compiled by the processor 30 to obtain an aspect of the object 40. In addition, the first tip extension 10 and the second tip extension 20 may not lies on a straight line when moving along the X-axis, but should remain in a plane.

Figure 6:
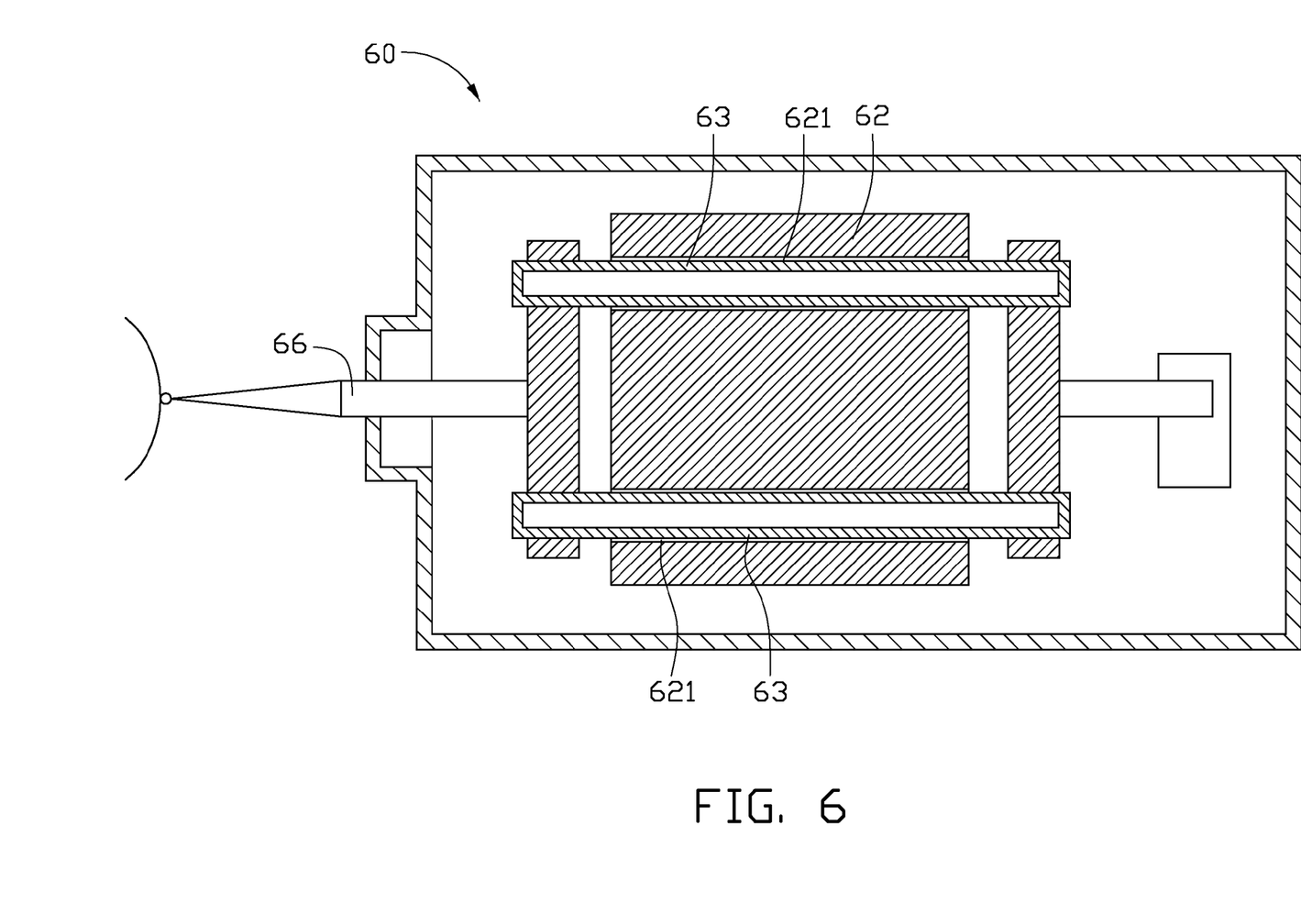
FIG. 6 is a top plan, cross-sectional view of a contour measuring probe in accordance with a second embodiment.
Figure 7:
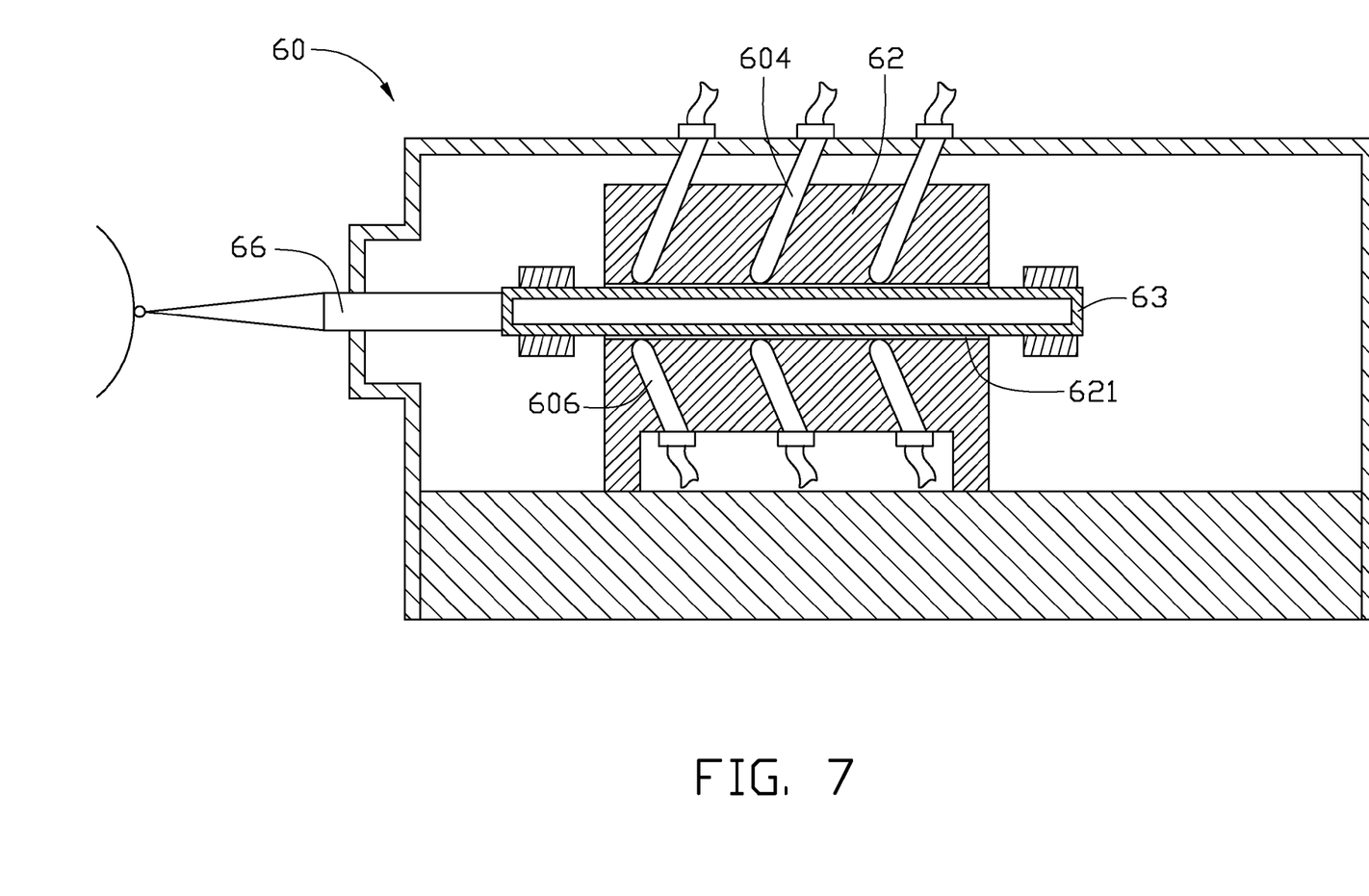
FIG. 7 is a side, cross-sectional view of the contour measuring probe of FIG. 6.

The measuring device can also use other measuring probes, for example, referring to FIG. 6 and FIG. 7, a contour measuring probe 60 in accordance with a second embodiment described as follows.

The contour measuring probe 60 is similar to the first contour measuring probe 10 except that the contour measuring probe 60 does not include the pipes 111 (shown in FIG. 2), but includes a plurality of tubes 604, 606 disposed obliquely in a tube guide 62 relative to hollow tubes 63. The contour measuring probe 60 includes the tube guide 62, two hollow tubes 63, and a tip extension 66. The tubes 604 are oblique relative to an axis of the hollow tubes 63. That is, an angle defined by extension directions of the tubes 604 relative to the axis of the hollow tubes 63 is in a range from larger than 0 degree and smaller than 90 degrees. The tubes 604, 606 are respectively parallel to and spaced from each other, and are communicated with tube chutes 621 defined in the tube guide 62. The tubes 606 are symmetrical to the tubes 604 relative to the axis of the hollow tubes 63, and the tubes 604, 606 are disposed in a same plane. Also, the tubes 606 may be not symmetrical to the tubes 604, but stagger with the tubes 604 so long as a force performed on the hollow tubes 63 at all directions except a moving direction of the tip extension 66 is balance. Alternatively, the tubes 606 can be omitted. With the condition, the hollow tubes 63 may offset under a force performed thereon in a direction perpendicular to the axis of the hollow tubes 63.

Figure 8:
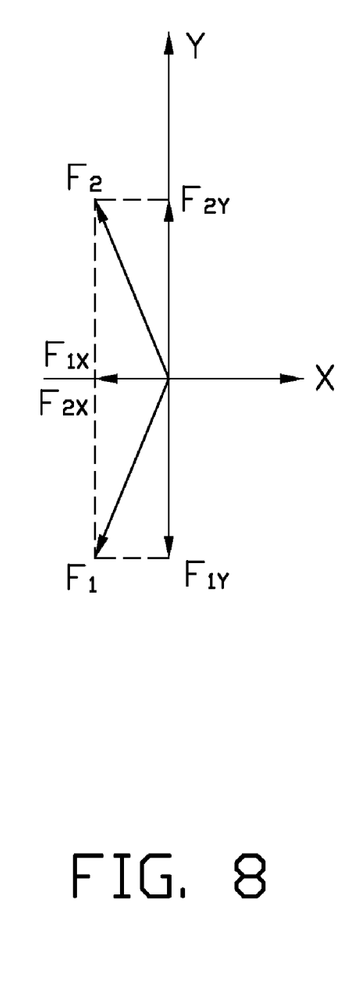
FIG. 8 is a force analysis view of hollow tubes of the first contour measuring probe of FIG. 6.

Referring to FIG. 8, when air is pumped into the tube chutes 621 and hits a sidewall of the hollow tubes 63 via the tubes 604, 606, air from the tubes 604 applies a force $F_1$ and air from the tubes 606 applies a force $F_2$ on the hollow tubes 63. A value of the force $F_1$ is the same as that of the force $F_2$ because the number of the tubes 604 is the same as that of the tubes 606, and also because the tubes 606 and the tubes 604 are symmetrically disposed. Therefore, a force applied to the hollow tubes 63 in an X-direction shown in FIG. 8 is $F_{1X}+F_{2X}$, and a force applied to the hollow tubes 63 in a Y-direction is 0. The force $F_{1X}+F_{2X}$ pushes the hollow tubes 63 together with the tip extension 66 to move. In addition, an air bearing is formed when air is filled in a gap between the tube guide 62 and the hollow tubes 63. Therefore, a friction between the tube guide 62 and the hollow tubes 63 is significantly small.

Figure 9:
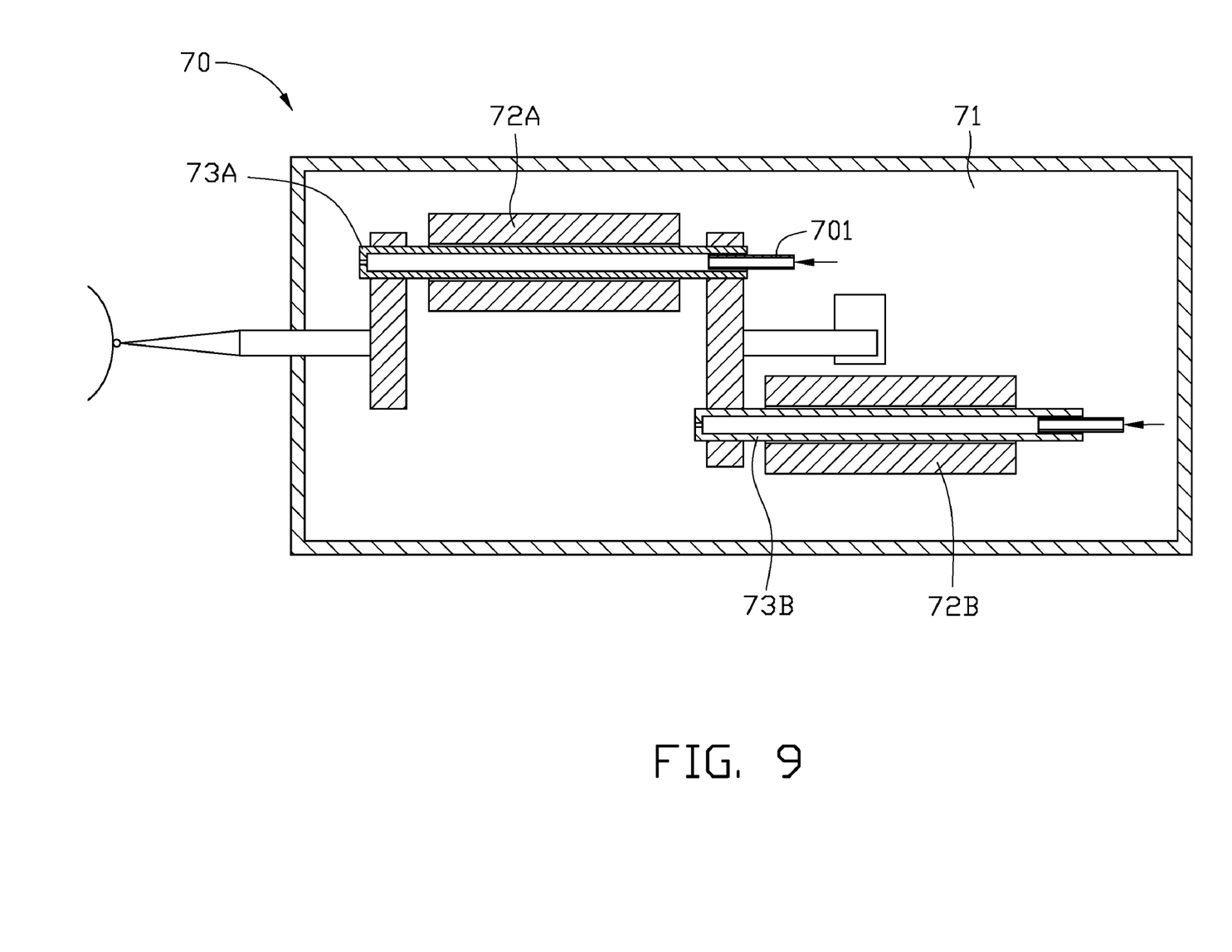
FIG. 9 is a top plan, cross-sectional view of a first contour measuring probe in accordance with a third embodiment.

Referring to FIG. 9, a contour measuring probe 70 in accordance with a third embodiment described as follows may also be used in a measuring device.

The contour measuring probe 70 is similar in principle to the first contour measuring probe 10 except that tube guides 72A, 72B holding hollow tubes 73A, 73B offset each other in the contour measuring probe 70. That is, the tube guide 72A is configured at a front portion of the base 71, and the tube guide 72B is configured at a back portion of the base 71. Because the tube guides 72A, 72B offset each other, the tube guides 72A, 72B of the contour measuring probe 70 collectively hold the hollow tubes 73A, 73B along a greater length as measured along a slidable direction of the tip extension (not labeled), than the first contour measuring probe 10. Therefore, the tip extension of the contour measuring probe 70 can move very steadily forward and backward with little or no lateral displacements. Alternatively, the contour measuring probe 70 can includes one pipe 701 only. Accordingly, air is pumped into one of the hollow tubes 73A, 73B. Thereby, the contour measuring probe 70 is further simplified.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A measuring device comprising:
   a first contour measuring probe comprising at least one hollow tube, a first tip extension being slidable in a first direction and driven by the at least one hollow tube of the first contour measuring probe, and a first displacement sensor used to sense a displacement of the tip extension;
   a second contour measuring probe comprising at least one hollow tube, a second tip extension being slidable in the first direction and driven by the at least one hollow tube of the second contour measuring probe, and a second displacement sensor used to sense a displacement of the second tip extension; and
   a processor electrically connected to the first displacement sensor and the second displacement sensor respectively.

2. The measuring device as claimed in claim 1, wherein each of the first and the second contour measuring probes further comprises a linear measuring scale, the linear measuring scale connects to the tip extension and moves correspondingly with tip extension, the displacement sensor senses a displacement of the linear measuring scale to obtain the displacement of the tip extension.

3. The measuring device as claimed in claim 1, wherein each of the at least one hollow tube defines a cavity for containing compressed air, and is configured to be driven by the compressed air.

4. The measuring device as claimed in claim 3, wherein each of the first and the second contour measuring probes further comprises at least one pipe, air is pumped in the cavity of the at least one hollow tube via the at least one pipe, the at least one hollow tube comprises an open end and an opposite cylinder base, the at least one pipe is partially received in the cavity of the at least one hollow tube at the open end, a gap is defined between the at least one hollow tube and the at least one pipe so that an air bearing is formed between the at least one hollow tube and the at least one pipe when air is pumped into the cavity of the at least one hollow tube via the at least one pipe.

5. The measuring device as claimed in claim 4, wherein each of the first and the second contour measuring probes further comprises a first tube frame and a second tube frame, the cylinder base of the hollow tubes and the tip extension are fixed to the first tube frame, the open ends of the hollow tubes and the displacement sensor are fixed to the second tube frame.

6. The measuring device as claimed in claim 1, wherein the at least one hollow tube further comprises an air discharge system configured to eject at least some of the air in the at least one hollow tube out of the at least one hollow tube.

7. The measuring device as claimed in claim 6, wherein the air discharge system is a combination consisting of any of at least one air eject hole defined in the cylindrical base of the at least one hollow tube, and at least one air eject hole defined in a sidewall of the at least one hollow tube.

8. The measuring device as claimed in claim 1, wherein each of the first and the second contour measuring probes further comprises at least one tube guide defining at least one tube chute therein, the at least one hollow tube runs through a corresponding tube chute, a gap is defined between the tube guide and the at least one hollow tube, and when air is pumped in the gap, an air bearing is formed.

9. The measuring device as claimed in claim 8, wherein each of the first and the second contour measuring probes further comprises a plurality of tubes obliquely disposed in a tube guide relative to the at least one hollow tube.

10. The measuring device as claimed in claim 8, wherein each of the first and the second contour measuring probes comprises two tube chutes, the two tube chutes are spaced apart from, and aligned parallel to each other.

11. The measuring device as claimed in claim 8, wherein each of the first and the second contour measuring probes further comprises two tube guide disposed on a base, one tube guide is set at a front portion of the base, and the other tube guide is set at a back portion of the base.

12. The measuring device as claimed in claim 11, wherein each of the first and the second contour measuring probes further comprises a cover engaging on the base, the cover defines an opening for allowing a part of the first tip extension to extend out therefrom.

* * * * *